United States Patent [19]

Pindar et al.

[11] Patent Number: 5,170,470
[45] Date of Patent: Dec. 8, 1992

[54] INTEGRATED MODEM WHICH EMPLOYS A HOST PROCESSOR AS ITS CONTROLLER

[75] Inventors: Andrew Pindar, Sunnyvale; Duane Marcroft, San Carlos; Andrew J. Nichols, III, Palo Alto, all of Calif.

[73] Assignee: National Semiconductor Corp., Santa Clara, Calif.

[21] Appl. No.: 189,062

[22] Filed: May 2, 1988

[51] Int. Cl.[5] .............................................. G06F 3/00
[52] U.S. Cl. ................................... 395/275; 395/325; 364/DIG. 1; 364/DIG. 2; 364/260; 364/240.8; 379/13; 375/8
[58] Field of Search .................... 379/93, 96–98; 370/85.1, 29, 60, 118, 100.1, 18, 84, 18, 61; 364/509, 200 MS File, 900 MS File; 375/38, 8, 80; 395/325, 500, 275, 600, 200, 650

[56] References Cited

U.S. PATENT DOCUMENTS

| | | | |
|---|---|---|---|
| 3,920,896 | 11/1975 | Bishop et al. | 364/200 |
| 4,012,725 | 3/1977 | Spangler et al. | 364/200 |
| 4,291,198 | 9/1981 | Anderson et al. | 375/8 |
| 4,620,294 | 10/1986 | Leung et al. | 364/900 |
| 4,649,479 | 3/1987 | Advani et al. | 364/200 |
| 4,742,482 | 5/1988 | Inskeep et al. | 364/900 |
| 4,809,269 | 2/1989 | Gulick | 370/100.1 |
| 4,825,358 | 4/1989 | Letwin | 364/200 |
| 4,839,916 | 6/1989 | Fields et al. | 379/13 |
| 4,922,534 | 5/1990 | Gorniak et al. | 379/98 |

OTHER PUBLICATIONS

Alan Clements, Microprocessor System Design PWS Publishers 1987 p. 389.

*Primary Examiner*—Thomas C. Lee
*Assistant Examiner*—Mehmet Gechil
*Attorney, Agent, or Firm*—Burns, Doane, Swecker & Mathis

[57] ABSTRACT

An embedded modem that does not require a dedicated controller and operates with existing computer to interpret new and redefined communications interrupt requests. In response to an interrupt request, the control of the processor is transferred from the communications software to a driver program stored in the main memory for the processor. Under the operation of the driver program, the processor interprets control characters and causes the appropriate commands to be carried out in the modem. Once these commands have been processed, the control of the processor reverts back to the communications program. The processor thereby functions as a virtual controller that is interpreted to be an external controller by the communications program.

30 Claims, 5 Drawing Sheets

INTEGRATED MODEM WHICH EMPLOYS A HOST PROCESSOR AS ITS CONTROLLER

BACKGROUND OF THE INVENTION

The present invention is generally directed to modems that enable data to be transferred between computers by means of telephone lines or other communication links. More specifically, the invention is directed to a communication system including a modem that is adapted to be incorporated or embedded into the structure of a computer and that emulates the functions of a peripherally disposed modem, to enable it to operate under the control of presently available communications application software without modification of that software. Although not limited thereto, the invention is particularly concerned with communication systems that are designed for use with microcomputers, also known as "personal computers."

Communications between computers involve the generation of two types of information: the data itself that is to be transferred between the computers and control characters that configure the modem to properly transmit and receive the data. The data can come from a number of different sources, e.g., directly from the computer keyboard or from a file stored on a disk, and the control characters are generated by a host processor under the control of a communications program. While the data is transmitted over the telephone lines, the control characters are not intended to be placed on the telephone lines and therefore it is necessary for the modem to recognize and intercept these control characters when they are generated by a host processor. One popular design for modems incorporates an 8250 UART (universal asynchronous receiver/transmitter) with a dedicated controller to intercept and process control characters.

In operation, when the host processor of the computer generates a command to the modem to carry out a function, e.g., dial a particular number, it places control characters in a register of the 8250 UART. The controller retrieves the command characters from the UART and configures the modem to transmit pulse or tone signals corresponding to the dialing of a telephone. The processor then provides the modem with the number to be dialed, via the UART and controller. After the dialing of the number has been completed, the controller waits for a response from the called modem. When the called modem responds and a connection is established over the telephone lines, the controller sends response characters to the host processor to indicate that a connection has been established and the transmission of data can take place.

During the time that the controller is configuring the modem and the connection is being established, the communications program may relinquish control of the host processor to enable the processor to execute its main program and attend to other internal tasks. Thus, when the modem is ready to send response characters to notify the processor that the connection has been established, it is necessary to provide a prompt which causes the communications program to receive the characters. One type of prompt is an interrupt request generated by the UART, which causes the processor to jump to an appropriate address in the communications program to receive the characters. Alternatively, or in addition, the UART can set a status flag in an appropriate register to indicate that a character is in place to be received by the processor. The processor can periodically poll the status register to determine whether the status flag has been set. In response to the interrupt or detection of the status flag, the processor receives the response characters indicating a connection has been established. It then retrieves or otherwise generates the data to be transmitted, and the modem controller enables this data to be directly sent to the modem, rather than intercept it, for transmission via the telephone lines.

In the past, modems of this type with dedicated controllers have existed as peripheral devices for microcomputers. For example, they might be located externally of the computer and be accessed by means of a serial communications port located on the computer. In this case, the transfer of data and control characters between the host processor and the modem takes place in a serial fashion. Alternatively, the modem could be incorporated within the housing for the computer itself. Typically, the modem with its controller and other interface circuitry might be mounted on a printed circuit board, or card, that plugs into an expansion slot on the motherboard for the computer. In this configuration, communications between the host processor and the modem can take place in a parallel fashion, directly using the data and control busses for the computer. Again, however, the modem is accessed by means of a communications port rather than being directly addressable by the host processor.

It is desirable to directly incorporate a modem into the structure of a computer, rather than have the modem exist as a peripheral device. In particular, it is desirable to include the modem circuitry directly on the motherboard of the computer and provide the modem with a unique device address that does not have to be accessed through an I/O port. Further along these lines, it is desirable to use the host processor of the computer as the controller for the modem, rather than employ a separate, dedicated controller.

To provide a modem which is incorporated within the structure of a computer presents certain practical considerations that may affect the overall desirability of such a feature from the standpoint of the consumer. When the modem becomes part of the computer architecture, the typical approach might be to have the communications program directly control the modem through the operating system for the host processor. Thus, a communications program which is designed for this type of application has to be specifically written for the operating system. As such, it would not be able to service the popular personal computer market because of the different modem architecture employed in personal computers.

More particularly, presently available applications programs for providing a communications function in personal computers are designed to operate with a modem that includes a dedicated controller and an 8250 UART or a device that emulates the functions of such a UART. A computer which includes an embedded modem but does not incorporate such an interface unit would not be capable of utilizing the presently available communications programs written for existing personal computer architecture. As a result such computers would require new software, and therefore may not be as attractive to the consumer. If it is necessary to provide a new communications program to operate the embedded modem, the cost of writing and acquiring this additional program will increase the net expense for the computer, and possibly require the user to learn new protocols and commands to operate the new program.

Accordingly, it is desirable to provide an embedded modem for a computer that does not require a dedicated controller but is capable of operating with existing communications software that was designed for modems with such a controller and a UART or similar interface for the controller.

BRIEF STATEMENT OF THE INVENTION

In accordance with the present invention, the foregoing objective is achieved by using the host processor of the computer as the modem controller, under the direction of a resident driver program. In operation the host processor, under initial control of the communications program, sends characters to a register in the modem circuitry which emulates a register in a UART. Upon receipt of these characters, the modem sends an interrupt request to the host processor which causes it to branch to a controller emulation program, i.e., a modem driver. Under the direction of this program, the processor retrieves the characters in the register and acts upon them accordingly. For example, if the characters are data to be transmitted, they can be presented to another register in the modem which passes them on to the modem modulator and transmitter. If they are command or control characters, they are interpreted by the driver and used to configure the modem for a particular operation.

When the driver has information to send to the communications program, for example to indicate the completion of an operation, it places a character in another register of the modem circuitry which also emulates the function of the UART, and then relinquishes control of the host processor to the communications program. Once the communications program retrieves this character in a normal manner, an interrupt request is presented to the host processor to indicate that the register is empty. Upon receipt of this interrupt request, the processor returns to the driver to place the next character in the register or take some other action appropriate to the retrieval of the character by the communications program.

Thus, the processor functions as a virtual controller, i.e., the communications program causes control characters to be sent or retrieved from a device that is interpreted to be an external controller. In effect, however, these characters are read back to, or generated by, the host processor in accordance with the driver program. As a result, the modem can operate without the need for a separate, dedicated controller.

The detailed manner in which the present invention functions to implement the foregoing principles of operation, as well as further features of the invention and the advantages offered thereby, are explained hereinafter with reference to preferred embodiments illustrated in the accompanying drawings.

DESCRIPTION OF THE ILLUSTRATED EMBODIMENT

To facilitate an understanding of the invention, a typical modem configuration will be described with reference to FIG. 1. The computer to which the modem is connected includes a host microprocessor 10 mounted on a printed circuit board 12 that is often referred to as the "motherboard." The processor 10 communicates with other addressable devices 14 mounted on the motherboard by means of an internal parallel bus 16. For example, these devices could include the main system memory (RAM), a coprocessor and the like.

Figure 1:
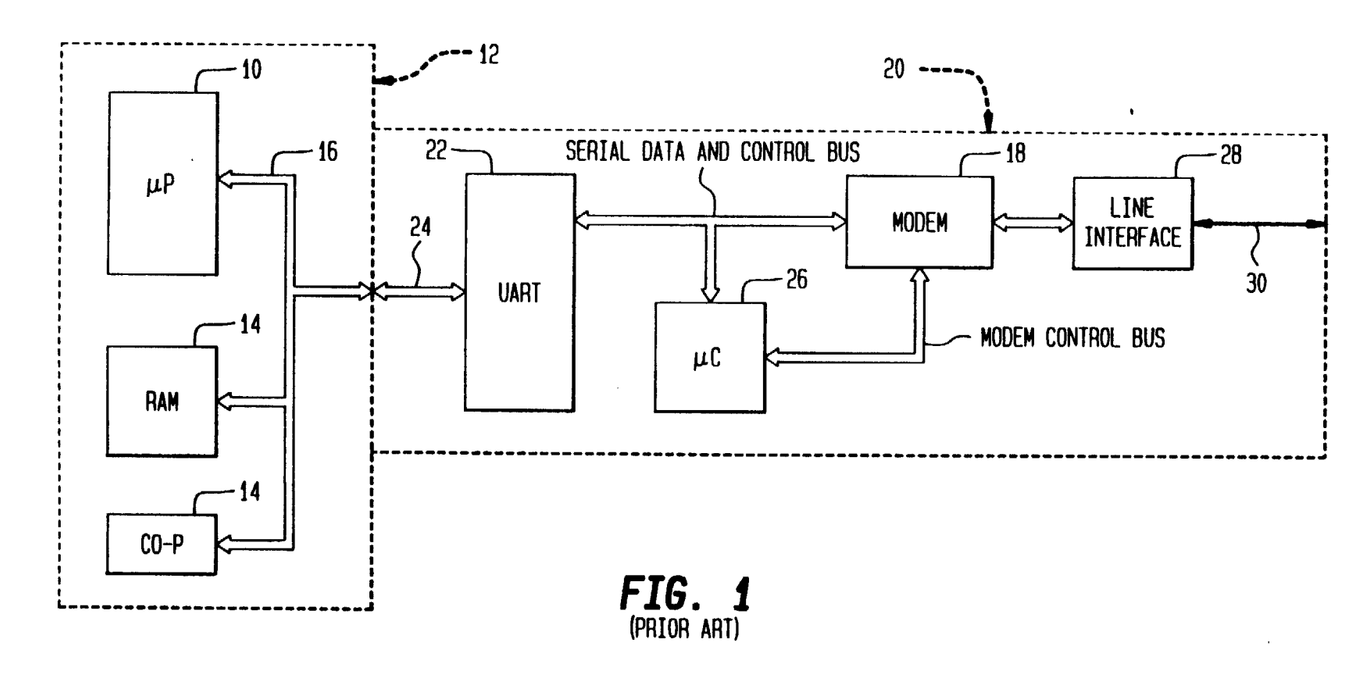
FIG. 1 is a general block diagram illustrating a modem connected between a computer and a telephone line.

In the configuration illustrated in FIG. 1, the modem 18 is mounted on a separate printed circuit board 20 that plugs into the motherboard 12. The modem 18 communicates with the host processor 10 by means of an UART 22, and is accessed by means of a communications port, e.g. COM 1, for the computer. The UART is connected to a parallel bus 24 that directly communicates with the internal bus 16 of the computer. The UART 22 primarily functions as a parallel-to-serial converter for data that is sent from the processor 10 and as a serial-to-parallel converter for data received from the modem 18. The transfer of data between the UART 22, the host processor 10 and the modem 18 takes place under the control of a dedicated microcontroller 26. In addition, the microcontroller 26 configures the modem 18 to carry out commands in accordance with control characters transmitted from the host processor 10. A line interface circuit 28 connects the modem 18 to a conventional telephone line 30. The line interface circuit 28 appropriately buffers the data transferred between the modem and the telephone line, as well as performs other functions such as ring detection and pulse dialing.

Instead of the UART it is possible to employ a USART (universal synchronous/asynchronous receiver/transmitter). Such an implementation may be particularly desirable where synchronous error-correction and data compression protocols are used for the data transmission. Although the following description is made with reference to a modem having a UART, it will be appreciated that it is equally applicable to modems which employ USARTs or other common communication controllers.

As an alternative to locating the modem on a card that plugs into the motherboard 12, the modem can be provided in a structure that is external to the computer housing. In such a case, the transfer of information between the computer and the modem might typically take place by means of a serial interface, such as an RS-232 interface device, that is accessed through a hardware communications port. In this type of arrangement the function of the UART is provided by a serial I/O card located within the computer housing.

Although the modem 18, UART 22 and microcontroller 26 are illustrated in FIG. 1 as being separate structures, in an actual implementation any two of these circuits, or all three of them, might be incorporated within a single integrated circuit chip. In a preferred implementation of the present invention, the modem circuitry is combined on a single chip with registers that enable the chip to emulate the function of the UART 22.

Figure 2:
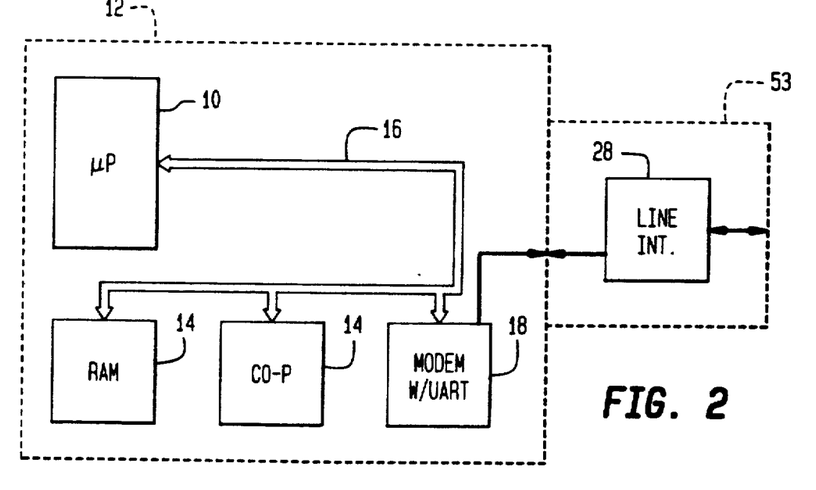
FIG. 2 is a block diagram of the hardware architecture for a communications system in accordance with the present invention.

In accordance with the present invention, the functions of the modem controller are carried out by means of the host processor 10 rather than a dedicated controller 26 as illustrated in FIG. 1. As a result, the modem circuitry can be located on the motherboard 12, as shown in FIG. 2. With this arrangement, control and data words can be directly exchanged between the processor 10 and the modem 18 in a parallel format using only the internal bus of the computer, i.e. without the need for a communications port to function as a hardware interface between them. Rather, the only hardware interface that is utilized is the line interface circuit 28, which can also be mounted on the motherboard or on a separate card 53.

To operate the modem in this type of arrangement, the control of the host processor 10 is alternated between the communications program and a controller emulation program, or device driver. The switching between the two programs is effected by means of communications interrupt requests. This concept which underlies the invention is explained in further detail with reference to the memory map illustrated in FIG. 3.

Figure 3:
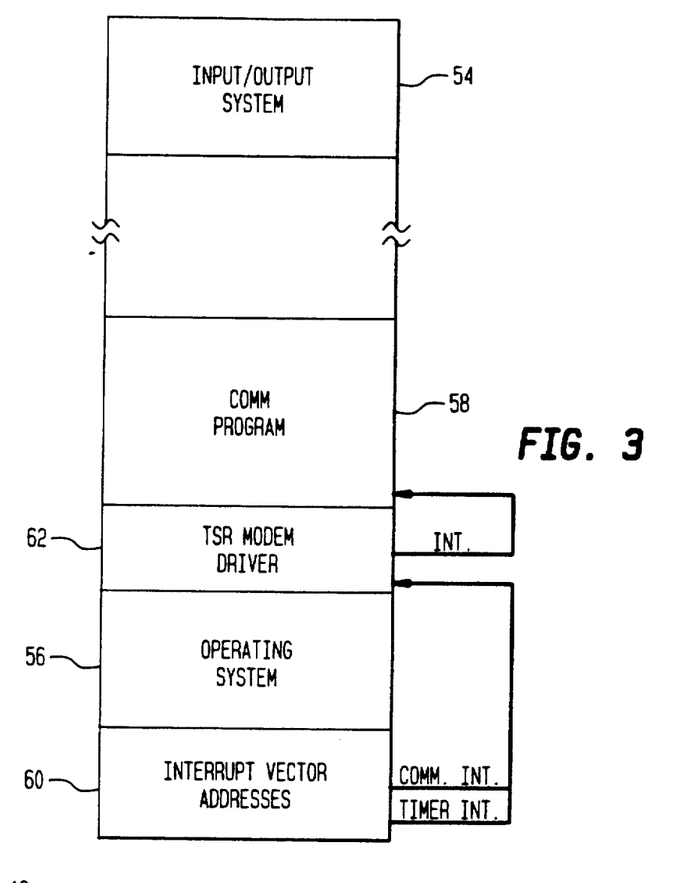
FIG. 3 is a memory map illustrating the types of programs stored in the main memory for the host processor.

Referring to FIG. 3, the main memory of the computer contains an input/output system 54, an operating system 56 and one or more applications programs at predetermined addresses. Among these applications programs is a communications program 58 which controls the processor to transmit and receive data via the modem. Also stored within the main memory is an interrupt vector address table 60. This table contains an address for each type of interrupt request that can be generated within the system. In response to the receipt of an interrupt request, the processor refers to the table 60 to determine the memory address to which it is to proceed in order to service the interrupt.

In a conventional application, the address stored in the table 60 for a communications interrupt might refer to the communications program 58. However, in accordance with the present invention, certain addresses in the table 60 are modified so that communications interrupts cause the processor 10 to refer to another application program 62 in the memory. More particularly, this program is a terminate-and-stay-resident (TSR) modem driver. Its function is explained in detail with reference to the structure shown in FIG. 4.

In addition, new types of communications interrupt requests are provided to enable the driver to properly control the communications operation. Basically, these new interrupt requests indicate conditions existing within the modem that are normally serviced by a dedicated controller. In the present invention, since the functions of such a controller are carried out by the host processor, these new interrupts are provided to alert the host processor to the fact that it must carry out an operation that emulates the function of the controller. For example, each time a character is placed in a UART register that is intended for the controller, an interrupt request is generated to cause the host processor to jump to the modem driver 62 and retrieve the character. In operation, every communications interrupt causes the host processor to branch to the modem driver. The driver temporarily prevents the host processor from acting on the interrupt until it determines whether the interrupt is a result of a conventional condition that is serviced by the communications program, or a new condition. If the former, the driver releases control of the host to the communications program for normal servicing. If it is a new type of interrupt condition, the driver remains in control and services the interrupt request. A more detailed explanation of this operation is provided with reference to the specific modem circuitry illustrated in FIG. 4.

Figure 4:
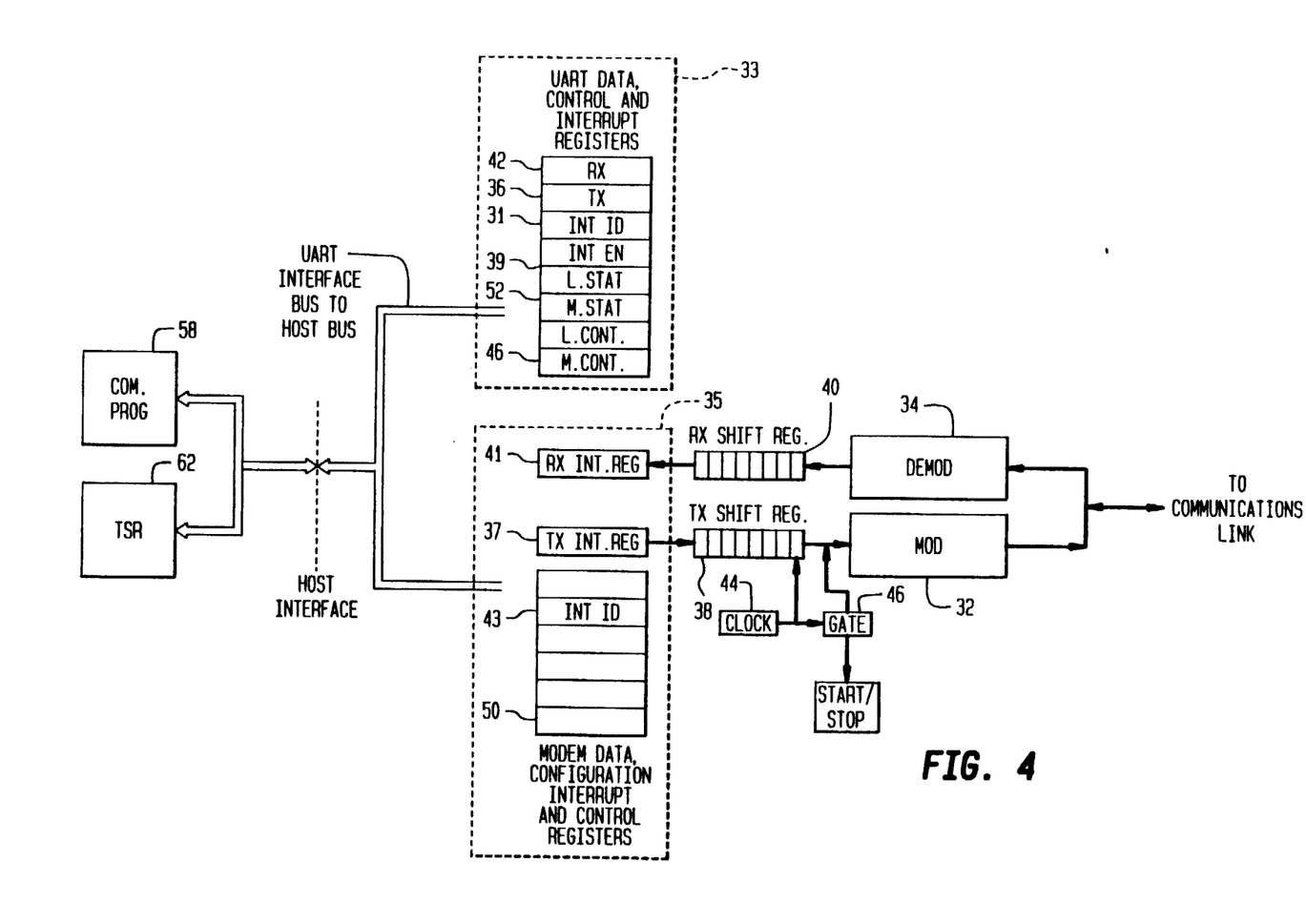
FIG. 4 is a more detailed block diagram of the modem and interface circuitry.

Referring to FIG. 4, those portions of a modem chip which are functional in the operation of the present invention are illustrated. The modem operates in two basic modes, a data mode and a command mode. In the data mode, data is passed between the communications program and the modem for transmission on the telephone line. In the command mode control characters are sent from the communications program to the modem, or vice versa, to configure the modem to carry out an operation to be performed. To function in the data mode, the modem includes a modulator 32 that accepts data generated by the host processor and transforms it into an appropriate audio frequency signal suitable for transmission over voice-grade telephone lines, or other forms of communication links. Similarly, it has a demodulator 34 that receives signals transmitted over the communication link and transforms them into suitable digital signals to be provided to the host processor.

The modulator 32 and demodulator 34 communicate with the host processor through two sets of registers in the modem circuit. The upper set of registers 33 shown in FIG. 4 emulate registers which are normally present in a UART. Basically, these are the registers that are accessed by the communications program, and the addresses of only these registers are in the address field of the communications program. The lower set of registers 35 relate to the control of various devices within the modem, as well as interfacing with the TSR modem driver 62 and handling of interrupts associated therewith. For example, one of the registers in the lower set 35 can be preset with a synchronization character for operation in a synchronous block mode. Incoming words are compared with the character stored in this register, and when a match is detected an interrupt can be generated to indicate that a synchronizaton character has been detected at the beginning of a block of data.

The modem driver has access to the registers in both sets 33 and 35. These various registers can be addressed in one of two different manners, in dependence upon the number of available connection pins on the IC package housing the modem. If there are an adequate number of address lines available, direct addressing of each register is preferred. For example, if there are 32 total registers in both sets 33 and 35, five address lines can be provided to directly address each register with a binary address unique to that register.

If, however, the number of address lines is limited, a bank selection technique can be employed. For example, if only three address lines are available to address the eight registers of an UART that are normally accessed by the communications program, the registers can be divided into four banks of eight registers each. To provide for selection among the banks of registers, two bit positions in one of the registers of the set 33 can be designated for identification of the selected bank. For example, one register that is commonly found in the set of UART registers is an interrupt identification register 31. Normally this register is a read-only register. However, in the context of the present invention any number of available bit positions in this register can be given read/write capability. The bits that have read/- write capability can be used to identify the particular bank of registers whose register is to be addressed by the address appearing on the three address lines. If only four banks of registers are available, only two bits need to be used from those available in the interrupt identification register 31 to provide a binary indication of the selected bank.

The functions of the individual registers will be explained in the context of specific operations carried out in the modem. Referring first to the operation of the modem in the data mode, when the communications program controlling the processor has a character of data to transmit over the telephone line, it awaits an indication that a transmit holding register 36 in the modem register set 33 is empty. The indication that the register is empty can be provided by means of an interrupt request or the setting of a bit in a line status register 39 that is polled by the processor. When the communications program in the host processor receives this indication, it places the character in the transmit holding register 36. In response to the placement of a character in the register 36, the modem circuit sends an interrupt to the host processor by setting the interrupt pin at the host/UART interface, to indicate that the transmit holding register is full. This interrupt condition is identified by setting a particular bit TXHRF in one of the registers 43 in the lower set 35.

When the interrupt is received by the host processor, it branches to the TSR modem driver 62. The driver first examines the register 43 and determines the condition which caused the interrupt. Since this particular condition is one which requires servicing by the driver, it maintains control of the processor. In particular, the driver reads the character from the transmit holding register 36 and, since it is data to be transmitted, writes it to a transmit intermediate register 37 upon receiving another interrupt indicating this register is empty. This interrupt condition is indicated by the setting of another bit TXIE in the register 43. The characters placed in the register 37 by the driver are successively transferred to a data buffer 38, from which they are serially transmitted to the modulator 32 for transmission over the telephone line.

Similarly, data received over the telephone line is demodulated in the demodulator 34 and stored in a buffer 40. From this buffer, the data is latched into an intermediate receive register 41. The modem circuit sends an interrupt to the processor and sets another bit position RXIF in the register 43 to indicate that the register 41 is full. In response to this interrupt, the TSR driver reads the character in the register. Since this character pertains to data to be sent to the communications program, the driver writes the character into a receive holding register 42 upon receiving an interrupt and detecting that a bit RXHRE in the register 43 has been set to indicate this register is empty. When the character is entered into the register 42, the modem circuit sends an indication to the processor, for example an interrupt or a status bit, causing the communications program to read the character.

In the command mode, control characters are generated by the host processor 10 under the control of the communications program, and sent to the modem to configure it to perform particular operations. These characters are not intended to be transmitted over the telephone line 30. Rather, they are employed by the modem controller to carry out particular operations.

To illustrate, an example will be described in which the host processor 10 commands the modem to dial a telephone number and then begins transmitting data once a telephone connection has been established with another computer. To begin the operation, the communications program 58 stored in the main memory 14 of the computer instructs the host processor to place the first character in a command string, e.g., "A", in the transmit holding register 36. Upon receipt of the TXHRF interrupt, the processor branches to the TSR driver, recognizes that information is being sent to it and accepts the character stored in the register 36. This character can be stored in a register or buffer, e.g., designated work space in the RAM for the host processor. The retrieval of the character from the register 36 by the processor causes a status flag in the status register 39 to be set, to indicate that the character has been accepted. This operation in turn results in an indication to the host processor 10 that the register is empty. Upon receiving this indication the communications program places the next control character in the data register. This process continues until the entire command string has been received and stored by the modem driver. Upon receipt of the command, in this case an instruction to dial a telephone number, the driver sets one or more registers and examines one or more registers in a bank of device control registers 50, which causes the modem to operate in a particular manner to dial a number and establish a connection. Thus, the driver would place information in the registers 50 which causes the modem to go into a pulse or tone dialing mode. Further, as in the case of a conventional modem, the telephone number is sent to the modem driver and also stored in suitable work space provided in the RAM. This number is then provided to the modem by the driver one digit at a time, through the use of the modem control registers.

Once the telephone number has been dialed and responded to by another modem with an appropriate handshaking routine, under the control of the driver, a connection is established between the two modems over the telephone line. During the time that the dialing and handshaking operations are being carried out, the communications program is in a wait state, looking for an indication that the connection has been established. Upon establishing the connection, the modem driver sends a character to the receive holding register 42, which sets a status flag in a modem status register 52 to indicate that information is available in the register 42 to be received by the host processor 10. When the communications program is alerted to the presence of this flag, for example by polling the register 52 or upon receipt of an interrupt identified in the register 31, it retrieves the character and takes the steps necessary to send data. Then, the host processor 10 places the data in the transmit register 36 for transmission over the telephone line through the intermediate register 37, the buffer 38 and the modulator 32 as described previously.

In effect, the host processor 10 functions as a virtual controller. In other words, to the communications program it appears that a separate controller is receiving and acting upon the data generated by the program and placed in the UART emulation registers 33. In actuality, however, that information is being processed by the host processor which generated the information, under the control of the TSR modem driver. Thus, complete compatibility with existing communications programs is maintained, and yet the modem is able to operate without the need for a dedicated controller.

From the forgoing it can be seen that the driver intercepts each character of data that is transmitted or received over the telephone line, by controlling the transfer of the characters between the hold registers 36,42 and the intermediate registers 37,41. With this type of operation, it is possible for the driver to process the characters in accordance with any desirable communications protocol. For example, the data could be stored in a buffer in blocks and encoded or decoded for error correction. Similarly, the data could be compressed to increase the effective transmission rate.

If these types of data processing operations are not desired, it is not necessary for the driver to intercept the data characters. In this case, the intermediate registers 37,41 could be eliminated, and the hold registers 36,42 can be connected to the buffers 38,40 by means of switches (not shown). The opening and closing of these switches can be controlled by the driver in dependence upon whether the characters in the registers 36,42 are command or data characters, respectively. Command characters would be read by the driver while the switches are open or closed, whereas data characters would be directly sent to the modulator, or received from the demodulator, only when the switches are closed.

Another advantage associated with the use of the intermediate register arrangement with interrupt control, as shown in FIG. 4, is the fact that this design eliminates the need for synchronous-to-asynchronous and asynchronous-to-synchronous data buffers. In a conventional modem, these buffers must be present between the UART and the output of the demodulator and the input of the modulator. Basically, they convert synchronous data to asynchronous data, and vice versa, to provide ASCII compatibility and a data rate that is within a predetermined range. More particularly, a synch/asynch buffer is usually present at the output terminal of the demodulator to detect formatted characters with missing stop bits. This buffer inserts the stop bits as appropriate to hold the data at a predetermined line rate, e.g., 1219 bits per second for a 1200 Baud modem.

Similarly, an asynch/synch buffer is typically present at the input terminal to the modulator. This buffer functions to remove stop bits when the data supplied from the host processor is too fast, to thereby decrease the bit rate to the modulator. If the incoming data is too slow, one or two stop bits are inserted to maintain the bit rate in a well-defined range.

In the modem architecture shown in FIG. 4, communications between the modulator or demodulator and the UART registers are internal to the circuit, and hence data is not passed to asynchronous devices. Consequently, there is no need to track a strict data rate or meet stringent asynchronous interface specifications. In operation, the data passing between the intermediate registers 37, 41 and their respective shift registers 38, 40 is asynchronous and without character formatting. Data is handled within the intermediate registers 37 and 41 on an availability basis by flagging the TSR modem driver 62 with appropriate interrupts. A synchronous transmit clock 44 is used to shift data in parallel into the register 38 from the intermediate register 37. Similarly, a recovered synchronous received data clock is used to shift the data out of the register 40 into the intermediate register 41. To meet the requirements of a particular transfer protocol, it may be necessary to add a start bit at the beginning of each transmitted word and/or one or two stop bits at the end of each word. These bits can be inserted into the bit stream entering the modulator by means of a gate 46 that is selectively enabled at appropriate times by the synchronous transmit clock. Alternatively, it is possible to add one extra stage at the beginning of the shift register 38 for the start bit, and two extra stages at the end for the stop bits, and to selectively enable these stages as required by the transfer protocol. With the interrupt driven approach used in the embodiment of FIG. 4, sensitivity to variations in data rate is reduced, since the interrupt technique can accommodate data rates outside of normal modem data rate specifications. As a further advantage, this approach can be used with any phase shift keyed (PSK) or quadrature amplitude modulated (QAM) type of modem, regardless of its operating speed.

The efficient exiting of the modem driver 62 after it performs each operation enables it to run simultaneously with the communications program without needlessly usurping system resources. Preferably, the driver program should not retain the control of the host processor for extended lengths of time, to prevent interference with the normal functions of the communications program. For example, when a dialing routine is being carried out through the modem, many communications programs allow the dialing to be cancelled by sending a predetermined character or string of characters. If the modem driver 62 retains control of the processor during the entire dialing routine, the generation of the cancelling characters would not be recognized. Accordingly, in a preferred embodiment the modem driver 62 uses another interrupt, i.e., the timer interrupt, to enable it to efficiently exit from the system and yet regain control at necessary times to perform the required functions.

In operation, the computer generates a timing interrupt request at periodic intervals, e.g., every 54 milliseconds. The TSR modem driver 62 sets the address in the interrupt vector address table 60 for the timing interrupt vector to point to itself. Thus, every 54 milliseconds when a timing interrupt request is generated, the host processor 10 jumps to the modem driver 62. This approach allows the modem driver program to time events without retaining control of the processor. Since the program will regain control of the processor within, at most, the time period between successive timing interrupt requests, the program can exit the system if nothing needs to be done within that time period.

For example, if the program is carrying out a pulse dialing operation, the modem must be put on hook for 33 milliseconds. Once the modem is put on hook, the driver 62 determines whether it will regain control of the processor before the expiration of that time period. If it is known that the timing interrupt will occur prior to the 33 milliseconds, the driver 62 can relinquish control of the processor until the next interrupt. If, however, the next timing interrupt will be more than 33 milliseconds away, the driver 62 will retain the control of the microprocessor until the 33 milliseconds have expired. To this end, the driver 62 can include a timer subroutine which counts the time elapsed from the most recent time of day interrupt, or conversely, the time remaining to the next interrupt.

Before the modem driver relinquishes control of the processor, it stores an indication of the particular state it is in, e.g. dialing, on-line, answering and handshake, etc. and the particular point in the state at which it presently resides. For example, if the modem is in the dialing state the driver might store an indication that it has turned on a tone generator and is waiting to turn it off. When the program re-enters the system upon the next timing interrupt, it notes the state at which it left and branches to a subroutine for handling that particular state.

In addition, the driver 62 can use the timing interrupts to ensure that it maintains the proper control of the microprocessor. More particularly, some communications programs may change the communication interrupt vector to point at themselves. However, in order to function properly the TSR modem driver 62 must be able to intercept any communications interrupt request before the communications program. To ensure that this occurs, the modem driver program 62 can check the interrupt vector address table 60 each time that it enters the system after a timing interrupt. If the communications interrupt vector still points to the modem driver 62, no action need be taken. If, however, the vector address has been changed, the driver 62 can re-map the interrupt vector so that it is the first address in the communications interrupt chain. In so doing, the modem driver 62 can store the address which was in the table 60, e.g. an address of the communications program, in an appropriate register. Once the program 62 has finished the operation required by the interrupt, it can then refer the processor to the stored address that was previously in the table.

Figure 5A:
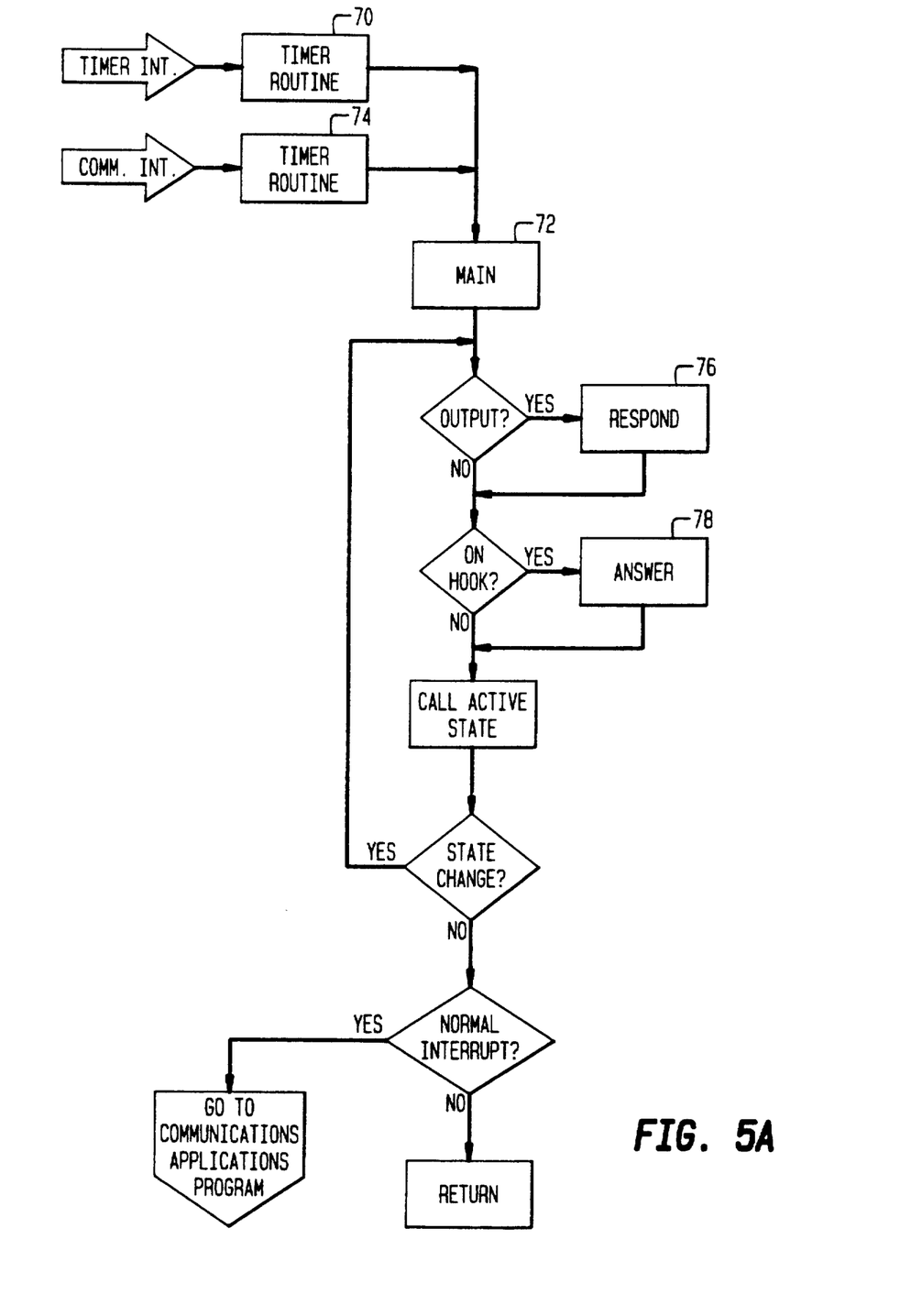
FIGS. 5A and 5B are flow charts of the general operation of the modem driver program.
Figure 5B:
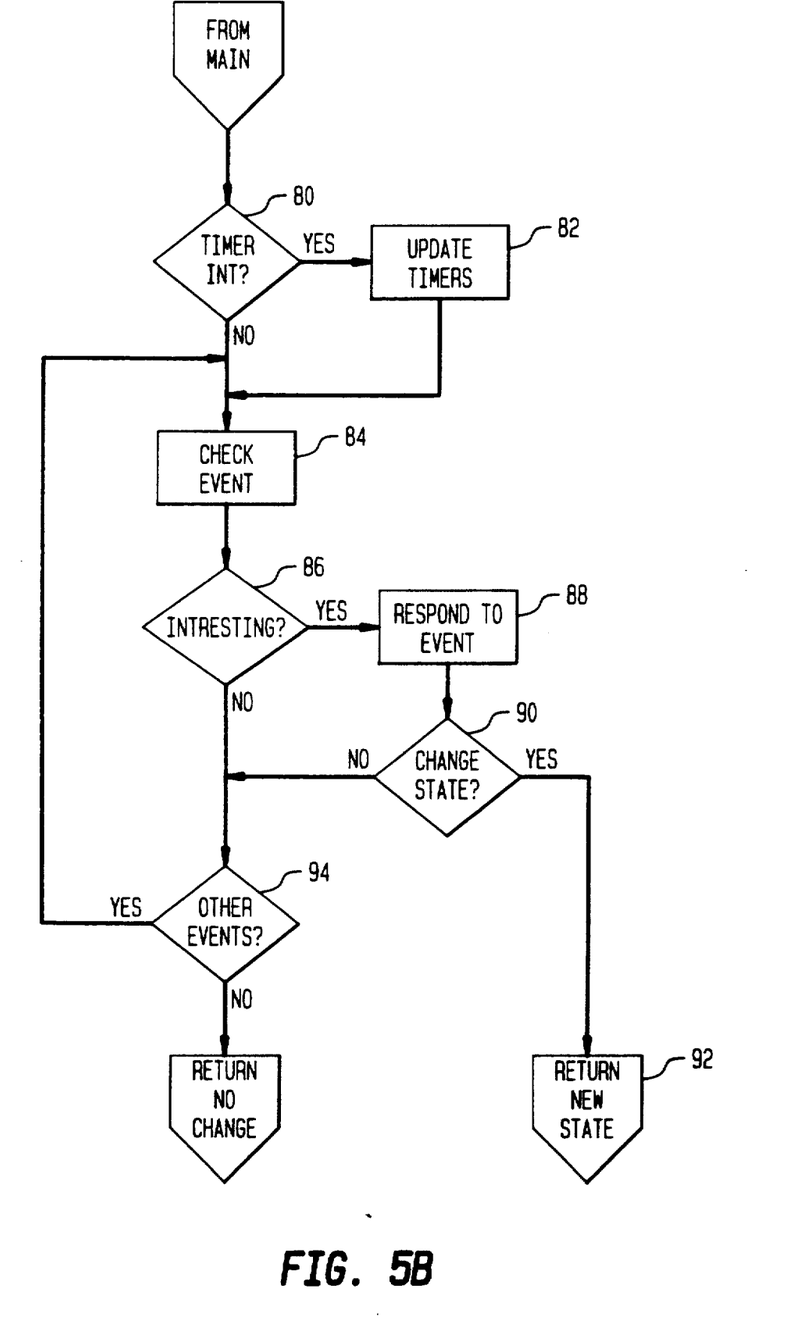

The foregoing operation of the modem driver is illustrated in further detail in the flow charts of FIGS. 5A and 5B. As noted above, entry into the program occurs upon generation of a timer interrupt or a communications interrupt. When a timer interrupt occurs, the processor calls a timer interrupt routine 70. As part of this routine, the processor checks the addresses stored in the interrupt vector address table to ensure that the communications interrupt vectors still point to addresses for the modem driver. If not, the vector addresses are changed and those which were present in the table are stored at appropriate addresses within the memory space for the driver. The operation then continues to the main routine 72.

Similarly, when a communications interrupt occurs the processor can first branch to a communications interrupt routine 74 by means of which it carries out housekeeping routines, e.g., setting of registers, and then continue to the main routine 72.

In the main routine, the processor first determines whether output information is waiting to go to the user. If so, it branches to a response subroutine 76 which causes it to generate the appropriate type of output information. The main routine then determines whether the modem is on-hook. If so, it branches to an answering subroutine 78 to ascertain whether a ringing signal is present and to answer it if appropriate. Finally, the main routine branches to a state handling routine for the particular state the driver was in when it last exited. The routine contains a loop in which it continues to call state handling routines for different states as long as the state changes. Once the state of the driver does not change, the driver determines if it was responding to a normal interrupt condition which requires the attention of the communications program. If so, it causes the processor to branch to the appropriate address in the communications program 58. If there is no interrupt condition which requires the attention of the communications program, the driver exits and thereby relinquishes control of the processor until the next interrupt occurs.

Examples of the various states of the driver include command states which occur when the modem is in a command mode and awaiting command characters, receiving the characters or executing the commands, dialing states which deal with taking the modem off-hook, waiting for a dial tone and dialing a number, answering and handshake states, and on-line states. The general operation of the driver for each of the possible states is illustrated in FIG. 5B.

When the program enters a state handling routine, it first determines whether it is responding to a timer interrupt (decision step 80). If so, it branches to a routine 82 for updating local timers. The program then proceeds to check for the possible event of interest (step 84). For example, if the program is in a dialing mode and has just taken the modem off-hook, it may be listening for the presence of a dial tone on the line. At step 86 the program determines if an interesting event, e.g. dial tone, has occurred. If so, it branches to a routine 88 for responding to that event, i.e. turn on the tone generator for the first digit in the number being dialed. Once this response has been initiated, the program determines whether a change of state should be indicated (step 90). In the foregoing example, the modem driver has gone from listening for a dial tone to generating the first tones or pulses in the number being dialed. In this case, a change of state has occurred and so the new state is stored in an appropriate status register and the subroutine returns to the main program with an indication 92 that there has been a state change.

If the response to an event does not result in a change of state, or if no interesting event took place, the modem driver determines whether any other events of interest are to be checked (step 94). If so, the foregoing procedure is followed for each such event. When no further events remain to be checked and there has been no change of state, the modem driver continues.

In summary, the present invention adds new interrupt sources and functions, as well as redefines conventionally used vectors, to thereby eliminate the need for a dedicated controller in a modem by sending information back to the host processor. The processor itself emulates the control functions that are necessary for the communications program to operate. In addition to eliminating the dedicated controller, processing firmware is also eliminated by storing the necessary control operations in the main memory 14 of the host processor.

As an alternative to the use of a separate TSR modem driver program, it is possible to incorporate the necessary commands into the operating system 56 for the computer. Thus, each time that the modem circuitry generates an interrupt request, this interrupt request can cause the appropriate portion of the operating system to be activated to carry out the necessary modem control functions.

While the operation of the invention has been described in the context of transferring characters one at a time between the modem and the host processor, it is not limited to this type of operation. For example, the modem circuitry which emulates the UART can be provided with a FIFO register (not shown) that enables the processor to load plural characters at a time into the modem, e.g. 8, 16, etc., and receive plural characters at once. The driver program can retrieve these characters from the FIFO register individually as needed without using processor time to transfer each character. Thus, the use of the processor can be carried out more efficiently.

It will be appreciated by those of ordinary skill in the art that the present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. In a computer having a host processor that is responsive to a communications program in a program memory to generate and receive control and data characters on an internal bus for use in communicating with other computers, a communications system which employs said host processor as a virtual controller, comprising:

a modem including means for receiving data characters from said internal bus and transmitting them onto a telephone line and for receiving data characters from said telephone line and placing them on said internal bus;

interface means, including at least one register for receiving control and data characters generated by said host processor in response to said communications program, for generating a predetermined interrupt request indicative of receipt of said control and data characters;

a modem driver program stored in said program memory and containing instructions for configuring said modem to carry out operations commanded by said communications program and controlling the operation of said modem to transfer data between the telephone line and said interface means; and control means responsive to the generation of said predetermined interrupt request by said interface means for causing said host processor to access said modem driver program stored in said program memory and to control said modem in accordance with the instructions contained in said modem driver program.

2. The communications system of claim 1 wherein said modem driver program comprises a portion of an operating system for said host processor.

3. The communications system of claim 1 wherein said modem driver program comprises an application program that is stored in said program memory as a terminate-and-stay resident program.

4. The communications system of claim 1 wherein said program memory includes a table containing addresses for respective interrupt requests and said control means includes means for replacing an address in said table that is associated with a particular interrupt request with a different address that is associated with said modem driver program.

5. The communications system of claim 4 wherein said computer generates timing interrupt requests at a periodic rate and said control means is responsive to each timing interrupt request to examine the address stored in said table for said particular interrupt request and replace it with said different address if said stored address is not the same as said different address.

6. The communications system of claim 1 wherein said interface means further includes a second register for storing characters intended for said host processor and generating a second interrupt request indicative of retrieval of a character from said second register, and said control means is also responsive to said second interrupt request to cause said host processor to access said modem driver program.

7. The communications system of claim 1 in which said computer includes a motherboard on which said host processor is mounted, and wherein said modem and said register are contained within an integrated circuit chip that is also mounted on said motherboard.

8. A method for controlling a modem in a computer having a host processor, comprising the steps of:

operating the host processor of the computer under control of a communications program to generate commands relating to transfer of data between the computer and a communications link;

generating an interrupt request to said host processor to indicate when information has been received by the modem;

9. The method of claim 8 wherein the step of transferring control of the host processor includes modification of an interrupt request address table to include a pointer that causes the host processor to address a memory location associated with said modem driver program when a communications interrupt request is generated.

10. The method of claim 9 wherein the modification of said table includes the steps of examining said table to determine whether an address pointer associated with the communications interrupt request refers to a memory location other than one associated with said modem driver program, storing said other memory location if it is not associated with said modem driver program, and replacing said other memory location in said table with said memory location associated with said modem driver program.

11. The method of claim 10 further including the step of returning the control of host processor to the communications program upon completion of said information processing step.

12. The method of claim 11 wherein the host processor is returned to the communications program by causing the host processor to address said other memory location which has been stored from said table.

13. The method of claim 10 wherein said computer generates a timing interrupt request at periodic intervals, and said step of examining said table is carried out upon the generation of each timing interrupt request.

14. The method of claim 8 wherein said computer generates a timing interrupt request at periodic intervals and the occurrence of each timing interrupt request also transfers control of the host processor to said modem driver program.

15. The method of claim 14 wherein said modem driver program stores an indication of an operating state that it is in upon returning control of the host processor to said communications program and returns to said state after the generation of each timing interrupt request.

16. A modem circuit for transferring information between a communication link and a computer having a host processor, comprising:

a modulator for transmitting information from the host processor onto the communication link;

a demodulator for receiving information on the communication link;

a transmit hold register for receiving characters generated by the host processor and providing them to said modulator;

means for generating a first interrupt request to the host processor when a character has been placed in the transmit hold register by the host processor;

a receive hold register for receiving characters that are to be provided to the host processor from said demodulator; and means for generating a second interrupt request to the host processor when said host processor retrieves characters from said receive hold register.

17. The modem circuit of claim 16 further including:

a transmit intermediate register for presenting characters to said modulator;

means for generating a third interrupt request to said host processor when characters are removed from said transmit intermediate register;

a receive intermediate register for receiving characters from said demodulator; and means for generating a fourth interrupt request to said host processor when characters are placed in said receive intermediate register.

18. The modem circuit of claim 17 further including means for controlling said host processor to cause it to retrieve characters in said transmit hold register and to place them in said transmit intermediate register when said characters represent data to be transmitted on the communication link, and for causing said host processor to retrieve characters from said receive intermediate register and place them in said receive hold register when they represent data received over the communication link.

19. The modem circuit of claim 18 wherein said control means is responsive to said first interrupt request to retrieve a character from said transmit hold register and is responsive to said third interrupt request to place the retrieved character in said transmit intermediate register, to thereby transfer data between said host processor and said modulator without the need for an asynchronous-to-synchronous buffer.

20. The modem circuit of claim 18 wherein said control means is responsive to said second interrupt request to retrieve a character from said receive intermediate register and is responsive to said fourth interrupt request to place the retrieved character in said receive hold register, to thereby transfer data between said host processor and said demodulator without the need for a synchronous-to-asynchronous buffer.

21. The modem circuit of claim 16 further including control means for selectively establishing a data path between said hold registers and the respective modulator or demodulator when data is being transmitted over the communication link, and for interrupting said data path when information other than transmitted data is exchanged between the modem circuit and the host processor.

22. A method for controlling a modem in a computer having a host processor, comprising the steps of:

operating the host processor of the computer under control of a communications program to generate commands relating to transfer of data between the computer and a communications line;

generating an interrupt request to said host processor to indicate when information has been received by the modem;

transferring control of the host processor from the communications program to a modem driver program in response to the generation of the interrupt request;

determining, under control of the modem driver program, whether the information received by the modem requires servicing by the communications program or by the modem driver program;

returning control of the host processor to the communications program if the information is to be serviced by the communications program; and maintaining control of the host processor by the driver program when the information is to be serviced by the driver program and retrieving said information at the host processor.

23. The method of claim 22 wherein the step of transferring control of the host processor includes modification of an interrupt request address table to include a pointer that causes the host processor to address a memory location associated with said modem driver program when a communications interrupt request is generated.

24. The method of claim 23 wherein the modification of said table includes the steps of examining said table to determine whether an address pointer associated with the communications interrupt request refers to a memory location other than one associated with said modem driver program, storing said other memory location if it is not associated with said modem driver program, and replacing said other memory location in said table with said memory location associated with said modem driver program.

25. The method of claim 24 wherein the host processor is returned to the communications program by causing the host processor to address said other memory location which has been stored from said table.

26. The method of claim 24 wherein said computer generates a timing interrupt request at periodic intervals, and said step of examining said table is carried out upon the generation of each timing interrupt request.

27. The method of claim 22 wherein said computer generates a timing interrupt request at periodic intervals and occurrence of each timing interrupt request also transfers the control of the host processor to said modem driver program.

28. The method of claim 27 wherein said modem driver program stores an indication of an operating state that it is in upon returning control of the host processor to said communications program and returns to said state after the generation of each timing interrupt request.

29. The method of claim 22 wherein said modem driver program is stored in a main memory for said host processor.

30. The method of claim 29 wherein said modem driver program is stored as a terminate-and-stay-resident program.

* * * * *